United States Patent
Cheon

(10) Patent No.: US 7,522,567 B2
(45) Date of Patent: Apr. 21, 2009

(54) ROUTER SUPPORTING NETWORK MOBILITY OVER NESTED MOBILE NETWORK AND A METHOD FOR TUNNELING THEREOF

(75) Inventor: Jung-hoon Cheon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 644 days.

(21) Appl. No.: 11/039,906

(22) Filed: Jan. 24, 2005

(65) Prior Publication Data
US 2005/0163134 A1 Jul. 28, 2005

(30) Foreign Application Priority Data
Jan. 28, 2004 (KR) .................... 10-2004-0005330

(51) Int. Cl.
*H04L 12/28* (2006.01)
*H04L 12/66* (2006.01)
*H04Q 7/24* (2006.01)

(52) U.S. Cl. .................... 370/338; 370/349; 370/401; 455/435.1; 455/445

(58) Field of Classification Search ............. 370/338, 370/349, 401; 455/435.1, 445
See application file for complete search history.

(56) References Cited

U.S. PATENT DOCUMENTS

| 6,195,705 | B1 * | 2/2001 | Leung | 709/245 |
|---|---|---|---|---|
| 6,487,406 | B1 * | 11/2002 | Chang et al. | 455/422.1 |
| 6,721,297 | B2 * | 4/2004 | Korus et al. | 370/338 |
| 6,842,462 | B1 * | 1/2005 | Ramjee et al. | 370/466 |
| 6,892,069 | B1 * | 5/2005 | Flynn | 455/432.1 |
| 6,947,451 | B1 * | 9/2005 | Dommety et al. | 370/328 |
| 6,954,790 | B2 * | 10/2005 | Forslow | 709/227 |
| 6,973,057 | B1 * | 12/2005 | Forslow | 370/328 |
| 6,973,086 | B2 * | 12/2005 | Patil et al. | 370/392 |
| 6,980,801 | B1 * | 12/2005 | Soininen et al. | 455/435.1 |
| 7,006,472 | B1 * | 2/2006 | Immonen et al. | 370/332 |
| 7,023,828 | B2 * | 4/2006 | Korus et al. | 370/338 |
| 7,130,614 | B2 * | 10/2006 | Sreemanthula et al. | 455/411 |
| 7,298,720 | B2 * | 11/2007 | Yamada et al. | 370/331 |
| 7,352,731 | B1 * | 4/2008 | Leung | 370/338 |
| 2004/0029555 | A1 * | 2/2004 | Tsai et al. | 455/403 |
| 2004/0097232 | A1 * | 5/2004 | Haverinen | 455/436 |
| 2004/0117508 | A1 * | 6/2004 | Shimizu | 709/249 |
| 2007/0025329 | A1 * | 2/2007 | Chen | 370/352 |

OTHER PUBLICATIONS

Taeeun Kim et al., "Network Mobility Support in Ipv6", Department of Computer Sciences and Engineering, Ewha Woman's University, 2003.

* cited by examiner

*Primary Examiner*—Alpus H Hsu
(74) *Attorney, Agent, or Firm*—Staas & Halsey LLP

(57) ABSTRACT

A router supporting network mobility over a nested mobile network environment, including: a first interface for data communication with an external node; a second interface for data communication with an internal node; and a controller for controlling routing through at least one of the first and second interfaces, obtaining an address of an end router that is the nearest to an Internet from a mobile network when a present position is found in a node on a nested mobile network, and transmitting through the first interface a binding update message including the address of the end router for tunneling between the end router and a home agent.

11 Claims, 6 Drawing Sheets

FIG. 6

| A | H | L | K | R | N | RESERVED | SEQUENCE # |
|---|---|---|---|---|---|----------|------------|
|   |   |   |   |   |   |          | LIFETIME   |
| MOBILITY OPTIONS |||||||||

ROUTER SUPPORTING NETWORK MOBILITY OVER NESTED MOBILE NETWORK AND A METHOD FOR TUNNELING THEREOF

CROSS-REFERENCE TO RELATED APPLICATION

This application claims benefit under 35 U.S.C. § 119 from Korean Patent Application No. 2004-5330, filed on Jan. 28, 2004, the disclosure of which is incorporated herein by reference.

BACKGROUND OF THE INVENTION

1. Field of the Invention

The present invention relates to a router supporting network mobility (NEMO) and a method for tunneling thereof. More particularly, the present invention relates to a router supporting network mobility over a nested mobile network and a method for tunneling thereof.

2. Description of Related Art

As the Internet is broadly and globally used in every field, the Internet access from mobile hosts or terminals in a mobile environment has become a necessity. Therefore, Internet Protocol (IP) mobility support for maintaining IP connectivity while a mobile terminal moves from site to site has attracted a lot of attention. In particular, IP mobility support for the mobile IP WG (Working Group) of IETE (Internet Engineering Task Force) has been actively discussed.

While the mobile IP WG has mainly focused on host mobility support, the NEMO WG in the IETF has been studied on the extension of existing mobile IP to support network mobility and considered a network, not a mobile host, as a mobile unit. For example, an NEMO protocol can be used in conjunction with any modes of transportation, such as automobiles, trains, planes, and ships, and mobile hosts in these means of transportation can be networked together.

In the case of NEMO protocol, a mobile router (MR), not a mobile host, becomes a mobile unit, and a mobile network that is formed around another MR can be a subnet to a higher level network. And, the subnet can have another subnet and/or mobile hosts. Here, when a mobile network has another subnet, it is said that the mobile network is nested. Depending on the situation, the networks can be more highly nested.

FIG. 1 illustrates the architecture of a nested mobile network over the Internet. According to the architecture shown in FIG. 1, there are four home agents HA_MR1-HA_MR4, four mobile routers MR1-MR4 included in the mobile network, mobile nodes MN, FN, and a correspondent node CN_FN2 on the Internet for conducting communication.

More specifically, the first mobile router MR1 includes the second and fourth mobile routers MR2, MR4 as its sub-nodes, and forms a mobile network Link1 together. In like manner, the second mobile router MR2 includes the second mobile host MN2 and the third mobile router MR3 as its sub-nodes, and forms a mobile network Link3 together. Likewise, the third and fourth mobile routers MR3, MR4, are linked to the mobile hosts MN3, FN2, MN1, and FN1, and form mobile networks Link4, Link2, respectively. That is, the network mobility enables a mobile network to have another mobile network therein.

The first to fourth home agents HA_MR1-HA_MR4 on the Internet are tunneled to the corresponding mobile routers MR1-MR4. Thus, through the tunnels, mobile network prefix information included in the mobile network are registered and forwarded for mutual packet exchange between the nodes existing in the mobile network and the correspondent node CN_FN2 on the Internet.

The first to fourth mobile routers MR1-MR4 forward a data packet transferred from the home agents HA_MR1-HA_MR4 to the mobile nodes within their own network, respectively, and transmit through the tunnel a data packet from the mobile nodes to the corresponding home agents HA_MR1-HA_MR4, respectively. When a mobile router becomes a lower level router of a certain mobile network, the lower level mobile router communicates with a higher level mobile router to receive a new address, and transfers the assigned address to its home agent.

Referring to the network architecture shown in FIG. 1, if the third mobile network Link4 formed around the third mobile router MR3 is newly transferred to the second mobile network Link3 formed around the second mobile router MR2, thereby forming a nested mobile network Link3, the third mobile router MR3 communicates with its higher level mobile router, the second mobile router MR2, to obtain an address, and sends a binding update message containing its address to the third home agent HA_MR3 within its home network. In this manner, the third mobile router MR3 is tunneled to the third home agent HA_MR3.

Here, the binding update message transmitted from the third mobile router MR3 is transferred over the Internet to the third home agent HA_MR3 via the second and first mobile routers MR2, MR1. Then, the second mobile router MR2 capsulates the transferred message, and transfers it to the first mobile router MR1. The first mobile router MR1 also capsulates the binding update message and transmits it to the Internet. At first, the binding update message on the Internet is transferred to the home agent HA_MR1, where the binding update message is decapsulated and is transferred to the second home agent HA-MR2. The second home agent HA_MR2 also decapsulates the received message and transfers it back to the first home agent HA_MR1.

On the nested mobile network, therefore, when a lower level mobile router sends address information to its home agent, the information or a data packet is repeatedly capsulated every time it passes through higher level mobile routers. Conversely, when a data packet is transferred from home agents of the higher level mobile routers to home agents of the lower level mobile routers, the data packet is decapsulated.

The same principle is applied to the packet transfer from a lower level node to a correspondent node on the Internet. In this way, the data packet from the home agent of a lower level node is finally transferred to a correspondent node which is the actual source of the data packet. The data packet transfer from the correspondent (i.e., corresponding) node to a final node of the lower level mobile network is exactly opposite to the above-described procedure. FIG. 2 diagrammatically illustrates a data packet transfer procedure from the correspondent node CN_FN2 on the Internet to the final node FN2 on the nested mobile network. Since the data packet transfer procedure from the correspondent node CN_FN2 to the final node FN2 of the lower level mobile network is opposite to the data packet transfer procedure described with reference to FIG. 1, a detailed explanation thereof is omitted.

FIG. 3 illustrates a header of the packet which is transferred from the correspondent node CN_FN2 to the final node FN2 of the mobile network as shown in FIG. 2. Originally in the packet header, the final node's address is entered as a destination address, and the correspondent node's address is entered as a source address, but later each home agent adds a corresponding mobile router's address to the destination address, and its own address to the source address, according to the sequence indicated by a digit number in FIG. 2.

However, a problem with the data packet transfer in the nested mobile network environment based on the related art NEMO protocol is that the data transfer takes more time than necessary due to the occurrence of repetitive capsulation and decapsulation. In addition, although the higher level mobile routers are not actually in charge of the transmission of a data packet from the lower level mobile router to its home agent, the home agents of the higher level mobile routers are respectively involved in the packet process. As a result, the transmission route is more complicated, and a so-called "pinball" routing problem occurs in the nested mobile network.

Moreover, even if a network is supposed to have an architecture for improving the network efficiency of the entire Internet as much as possible, the transmission route over the nested mobile network environment based on the related art NEMO protocol rather increases the traffic in the Internet and deteriorates the network efficiency of the entire Internet.

BRIEF SUMMARY

An aspect of the present invention is to solve at least the above problems and/or disadvantages and to provide at least the advantages described below. Accordingly, an aspect of the present invention is to provide a router supporting network mobility over the nested mobile network and a method for tunneling thereof, capable of simplifying a data transmission route not only between an internal node of the mobile network and an external node of the mobile network, but also between internal nodes of the mobile network, and improving the data transmission rate over the entire network.

According to an aspect of the present invention, there is provided a router supporting network mobility over a nested mobile network environment, including: a first interface for data communication with an external node; a second interface for data communication with an internal node; and a controller for controlling routing through at least one of the first and second interfaces, obtaining an address of an end router that is the nearest to an Internet from a mobile network when a present position is found in a node on a nested mobile network, and transmitting through the first interface a binding update message including the address of the end router for tunneling between the end router and a home agent.

The controller may add to the binding update message a flag indicating a nested state of the mobile network.

When the binding update message is received through the second interface and a higher level mobile network is not present, the controller may add to the binding update message a header indicating the controller's address as a source address, and transmit the binding update message including the header to a home agent of the mobile router that transmitted the binding update message.

According to another aspect of the present invention, there is provided a method of tunneling of a router over a nested mobile network environment, including: routing through at least one of a first interface and a second interface, the first and second interfaces being for data communication with an external node and an internal node, respectively, to find a present position on a mobile network; obtaining an address of an end router that is the nearest to an Internet from the entire mobile network when a present position on the mobile network is found in a node on the nested mobile network; generating a binding update message including the address of the end router when the address of the end router is obtained; and transmitting the binding update message through the first interface for tunneling between the end router and a corresponding home agent when the binding update message is generated.

The binding update message may include a flag indicating a nested state of the mobile network.

The method may include: adding to the binding update message a header having a present address as a source address when a higher level mobile network is not present and the binding update message is received through the second interface; and transmitting the binding update message including the header to a home agent of the mobile router that sent the binding update message through the first interface.

According to another aspect of the present invention, there is provided a method of quickening data packet transfer in a nested mobile network environment, including: forming a tunnel between a home agent of a mobile router and an end router closest to an Internet by routing through at least one of a first interface and a second interface, the first and second interfaces being for data communication with an external node and an internal node, respectively, to find a present position on a mobile network, obtaining an address of the end router from the entire mobile network when a present position on the mobile network is found in a node on the nested mobile network, generating a binding update message including the address of the end router when the address of the end router is obtained, and transmitting the binding update message through the first interface for tunneling between the end router and a corresponding home agent when the binding update message is generated; and transmitting the data packet from the home agent to the end router through the tunnel.

According to another embodiment of the present invention, there is provided a method of reducing Internet traffic during data communication between nodes of a nested mobile network, including: forming a tunnel between a home agent of a mobile router and an end router closest to an Internet by routing through at least one of a first interface or a second interface, the first and second interfaces being for data communication with an external node and an internal node, respectively, to find a present position on a mobile network, obtaining an address of the end router from the entire mobile network when a present position on the mobile network is found in a node on the nested mobile network, generating a binding update message including the address of the end router when the address of the end router is obtained, and transmitting the binding update message through the first interface for tunneling between the end router and a corresponding home agent when the binding update message is generated; and transmitting the data packet from the home agent to the end router through the tunnel. The data communication between the nodes does not go through the Internet.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 6 illustrates an example of an extended binding update message according to the embodiment of FIG. 4.

DETAILED DESCRIPTION OF EMBODIMENT

Figure 1:
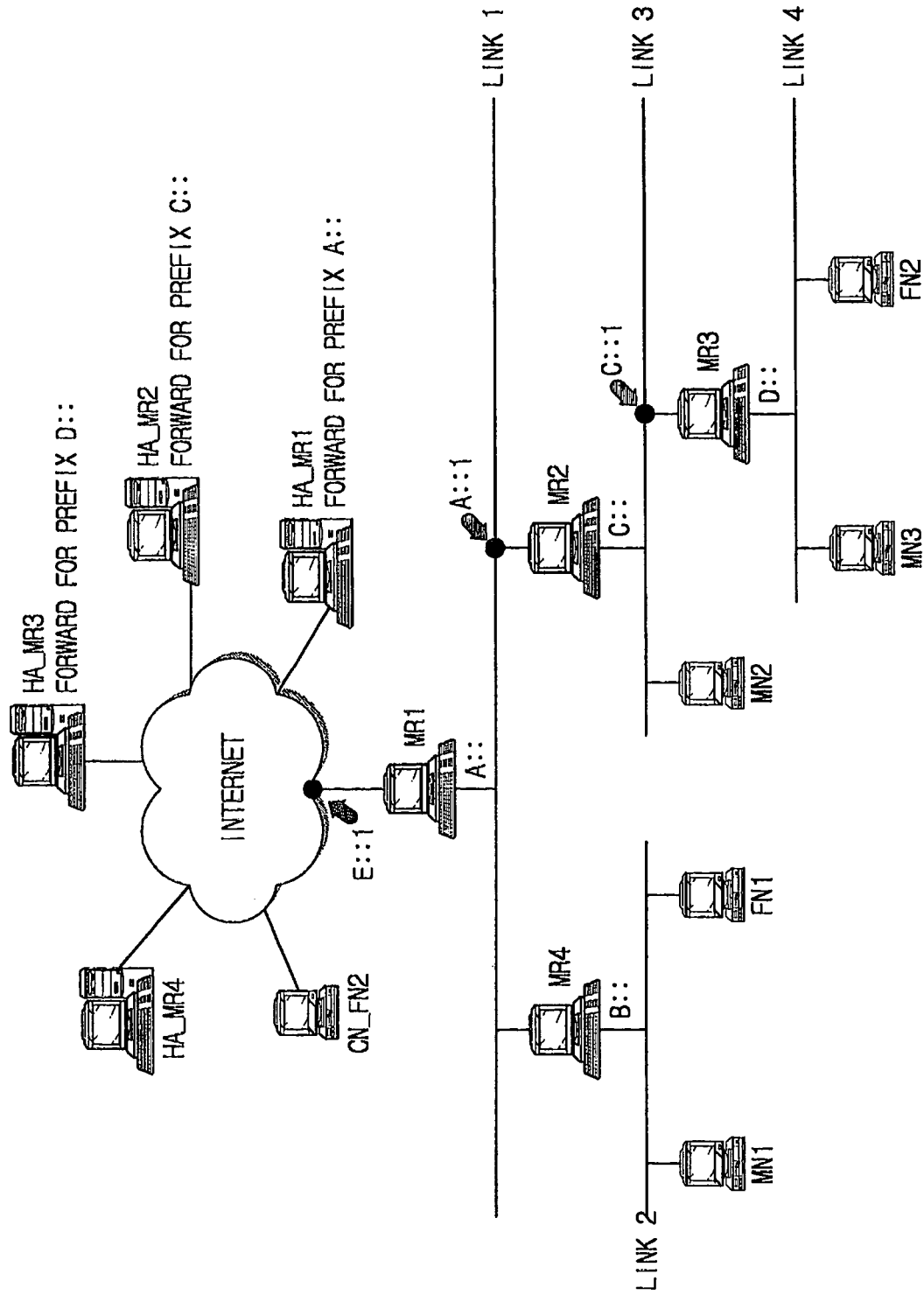
FIG. 1 illustrates an architecture of a nested mobile network over the Internet.
Figure 2:
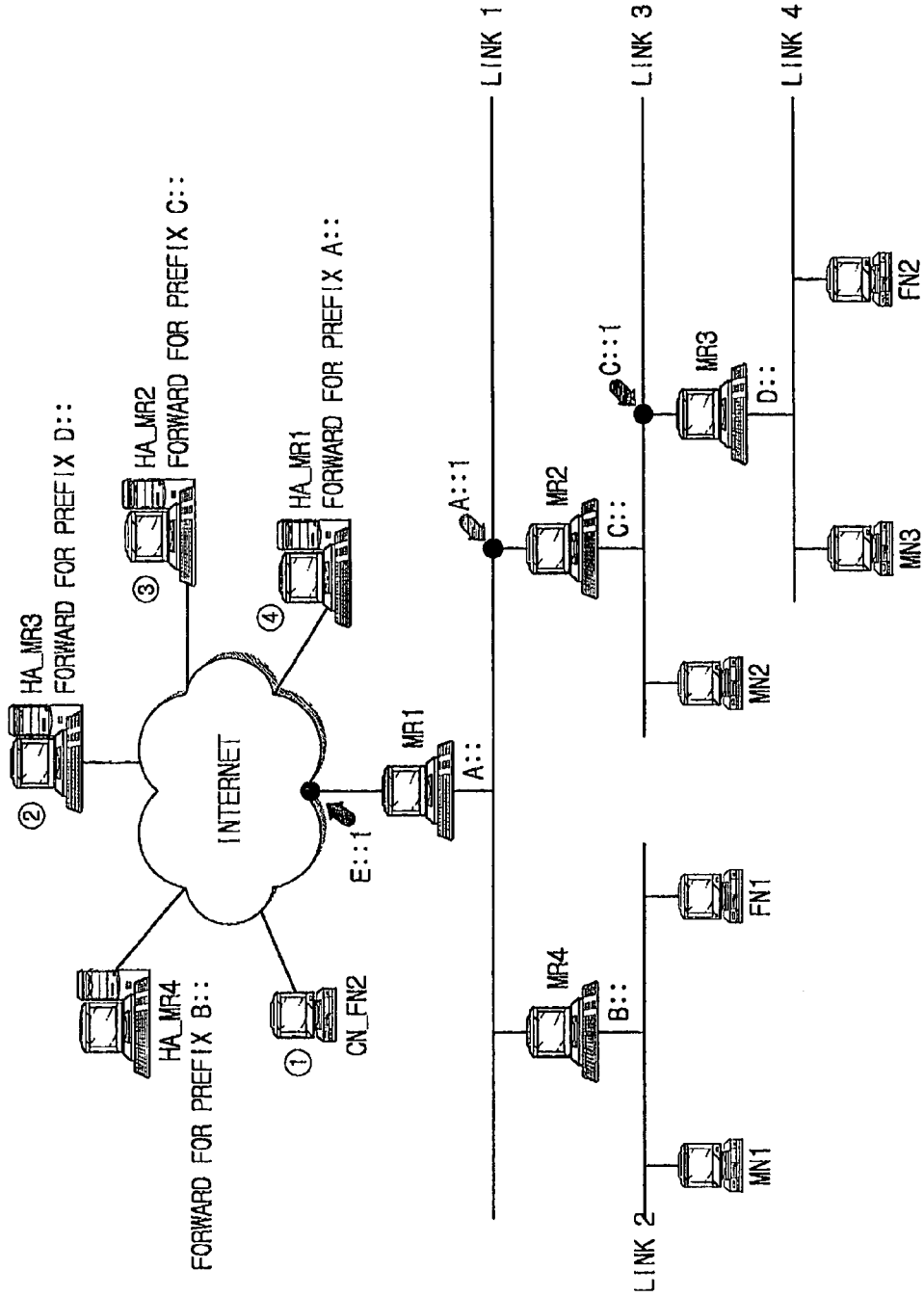
FIG. 2 schematically illustrates a data packet transfer procedure based on a related art NEMO protocol over a nested mobile network of FIG. 1.

Reference will now be made in detail to an embodiment of the present invention, examples of which are illustrated in the, accompanying drawings, wherein like reference numerals refer to the like elements throughout. The embodiment is described below in order to explain the present invention by referring to the figures.

Figures 3, 4:
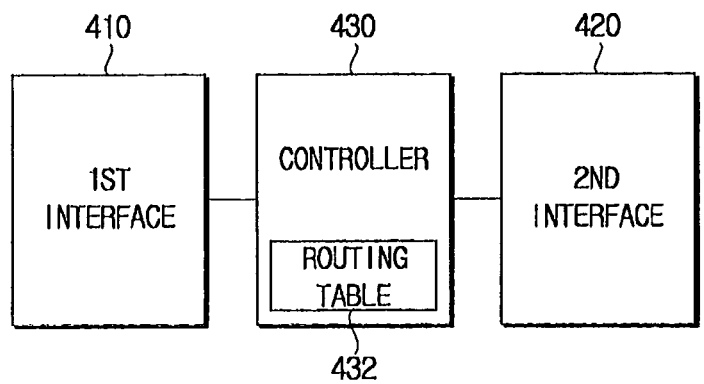
FIG. 3 illustrates a header of a packet which is transferred from a correspondent node to a final node of the mobile network shown in FIG. 1.
FIG. 4 is a schematic block diagram of a router according to an embodiment of the present invention.

FIG. 4 is a schematic block diagram of a router supporting network mobility according to an embodiment of the present invention. The router includes a first interface 410, a second interface 420, and a controller 430 having a routing table 432.

The first interface 410 is connected to an external node for data communication. The external node can be a mobile router or a mobile or fixed router connected directly to the Internet.

The second interface 420 is connected to an internal node for data communication. The internal node can be a mobile terminal or another mobile router.

The controller 430 performs routing protocol through the first interface 410 and/or the second interface 420. If a present position coincides with a node on the nested mobile network, the controller 430 obtains an address of an end router that is nearest to the Internet, and transmits a binding update message containing the address of the end router through the first interface 410 so that home agents can be tunneled into the end router. Moreover, if a binding update message is received through the second interface 420 while there is no higher level mobile network, the controller 430 adds to the binding update message a header having its address in the mobile network as a source address, and transmits the message to the home agent of the mobile router which originally transmitted the binding update message.

Figure 5:
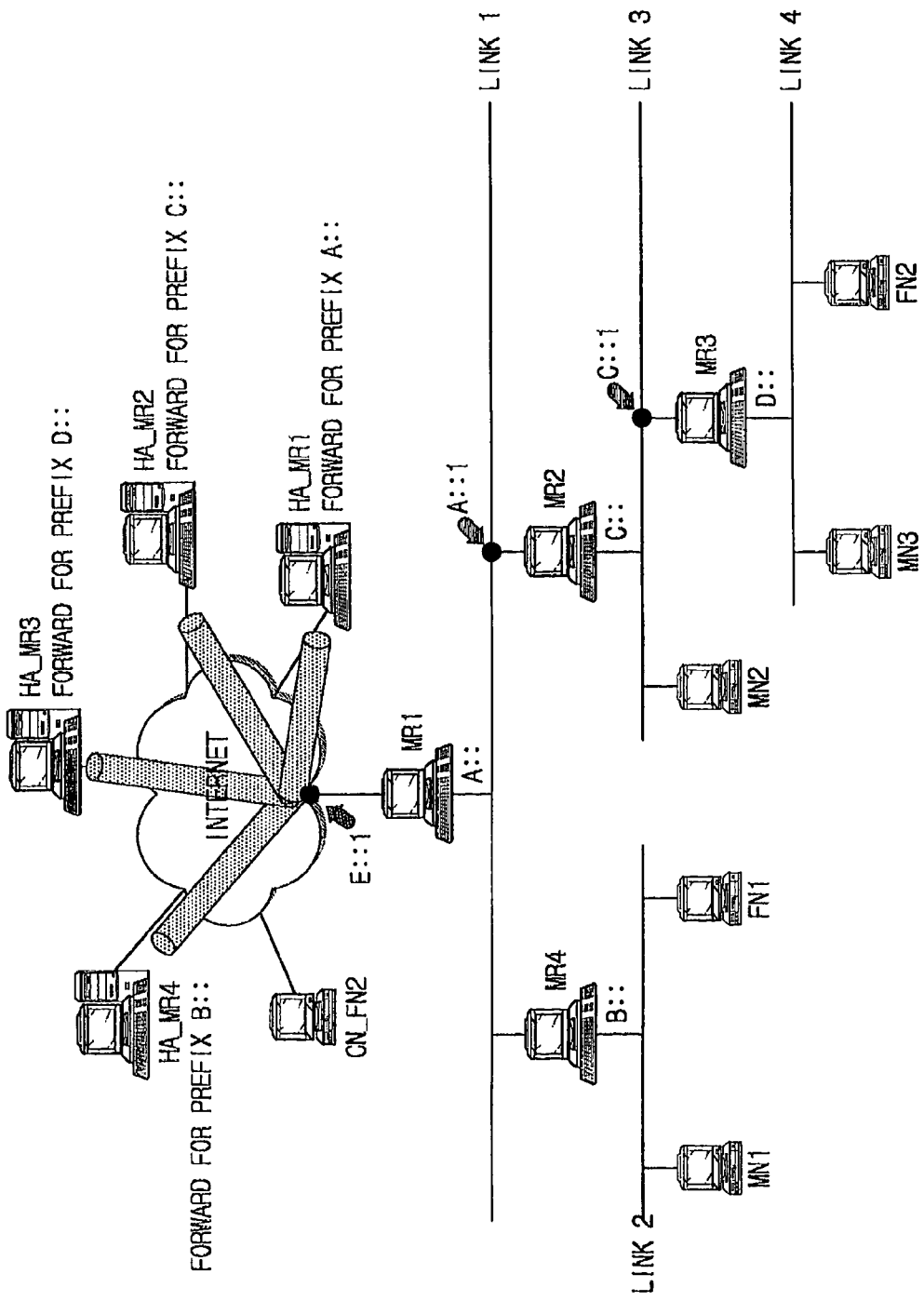
FIG. 5 illustrates tunnels between an end router and each mobile router in a nested mobile network environment according to the embodiment of FIG. 4.

FIG. 5 illustrates tunnels between an end router MR1 and each mobile router HA_MR1-HA_MR4 in the nested mobile network environment according to an embodiment of the present invention. For ease of explanation, the tunneling procedure described hereinafter involves the third mobile router MR3 and the nested mobile network Link3. First, the third mobile network Link4 having nodes linked around the third mobile router MR3 becomes subordinate to the second mobile router MR2 forming the nested mobile network, the third mobile router MR3 requests a CoA (Care-of-Address) from the second mobile router MR2 to get 'C::1" address, and performs routing with every router within the entire mobile network. Here, the CoA is a temporal address assigned to a higher level mobile router that is accessed by a sub-router of the mobile network.

After receiving the CoA, the third mobile router MR3 obtains, through internal routing, CoA information of the end router MR1 that is nearest to the Internet. In the present embodiment, each mobile router is aware of (recognizes) the CoA of each node on the mobile network through internal routing within the mobile network. Thus, if the CoA of the nodes changes, the routing table of each mobile router is also updated.

After obtaining the CoA of the end router MR1 through routing, the third mobile router MR3 generates a binding update message as shown in FIG. 6. The binding update message includes a flag indicating the situation of the nested mobile network, and the current CoA of the end mobile router.

FIG. 6 illustrates an example of an extended binding update message according to an embodiment of the present invention. The extended binding update message format is similar to the one suggested by the related art NEMO protocol, except that the extended binding update image includes the capital 'N' (which represents the nested state of the mobile network) in the flag entry. The capital 'N' is designated for a mobile router to command another mobile router's home agent HA_MR to do binding update. The extended binding update message has the present CoA of the mobile router as the source address, and the home agent address HA_MR of the message-receiving mobile router as the destination address. The extended binding update message includes the present CoA of the end mobile router MR1 as an option.

When the binding update message is generated, the third mobile router MR3 transmits the generated binding update message to the third home agent HA_MR3. At this time, the message is transmitted to the end router MR1 via the second mobile router MR2. However, the message is not capsulated by the second mobile router MR2, but is transmitted to the end router MR1 based on the routing protocol within the mobile network.

Meanwhile, the end router MR1 adds a header to the binding update message before transmitting the message to the home agent of the third mobile router MR3. In the header, the end router's address is written as the source address of the message, and the address of the third home agent HA_MR3 as the destination address.

After receiving the binding update message from the end router MR1, the home agent HA_MR3 of the third mobile router MR3 recognizes that the third mobile router MR3 is on the nested mobile network, and tunnels into the end mobile router MR1 on the basis of the address of the end router MR1 included in the option.

After the tunnel between the end mobile router MR1 and the third mobile router MR3 is formed, the data packet that is to be transmitted from the mobile terminals linked to the third mobile router MR3 to the correspondent node CN_FN2 is first transmitted to the third home agent HA_MR3 along the transmission route of the binding update message, and then to the correspondent node over the Internet.

Figure 7:
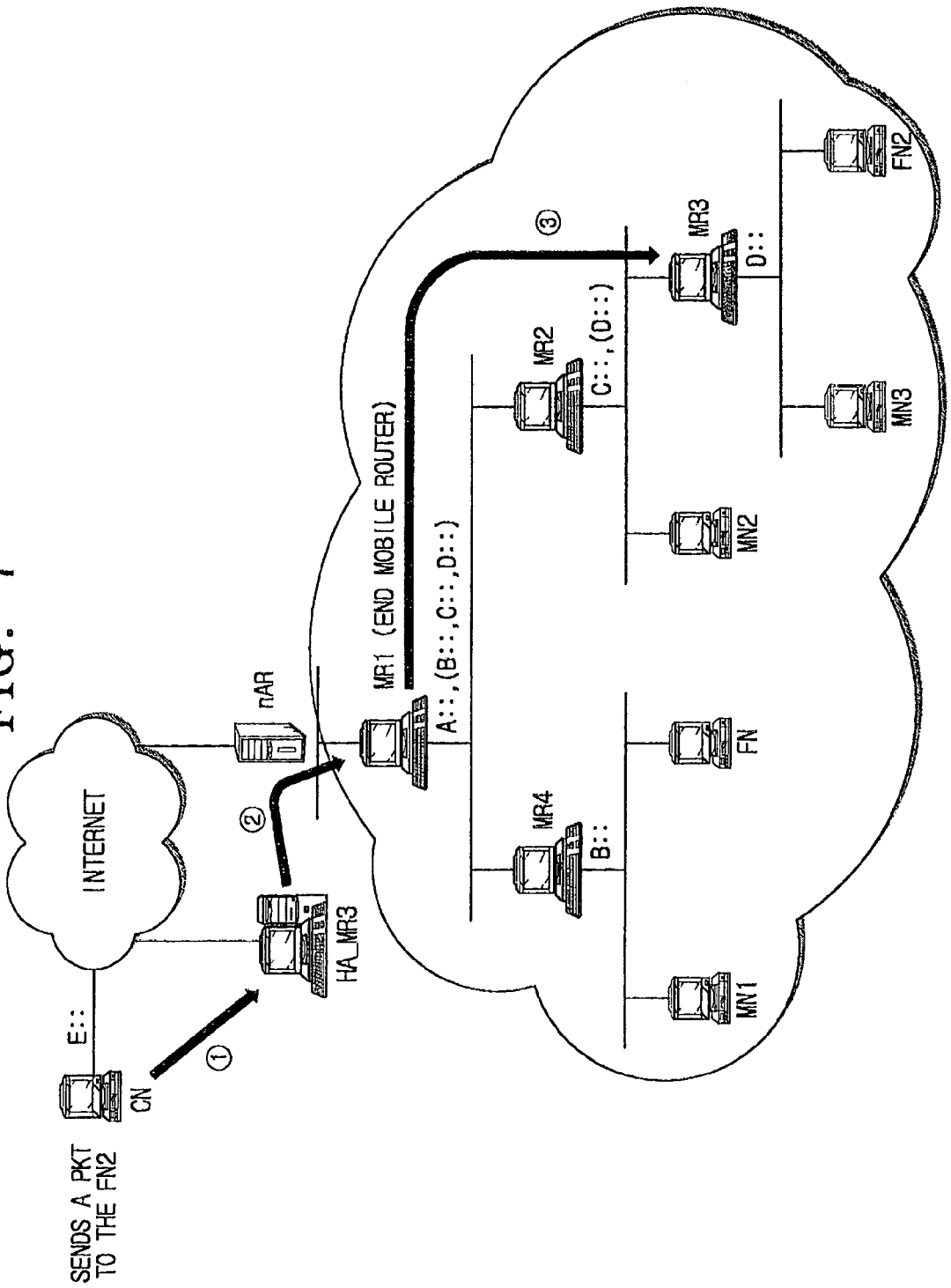
FIG. 7 illustrates a data packet transfer procedure from a correspondent node to a second final node that is subordinate to a third router according to-the embodiment of FIG. 4.

FIG. 7 schematically illustrates a data packet transfer procedure from the correspondent node CN_FN2 to the second final node FN2 subordinate to the third mobile router MR3 of FIG. 5. The data packet is first transferred to the third home agent HA_MR3 from the correspondent node CN, and then to the end router MR1 through the tunnel formed between the third home agent HA_MR3 and the end mobile router MR1 of the mobile network Link4. Here, the mobile network Link4 is where the third home agent HA_MR3 and the second final node FN2, which is the destination of the data packet, belong. Later, the end router MR1 transfers the data to the second final node FN2 through the second and third mobile routers MR2, MR3, according to the routing protocol within the mobile network.

It is to be understood that the above-described tunnel formation and data packet transfer procedures are applicable to other mobile nodes included in the entire mobile network, regardless of how deeply the mobile networks are nested.

According to the described embodiment of the present invention, the router supporting network mobility and the method for tunneling thereof simplify the packet transfer between the nodes and home agents on the mobile network or between the nodes and correspondent nodes and thus, shorten delay in data transfer since the data does not have to go through mobile routers and their corresponding home agents unnecessarily.

Also, according to the described embodiment of the present invention, data transmission is performed according to the routing protocol within the mobile network, so the mobile routers do not have to capsulate the data packet. Thus, data process rate (efficiency) is improved. Also, data communication between internal nodes of the mobile network does not go through outside the mobile network, but is performed according to the routing protocol within the mobile network. Moreover, delay in the data packet transmission is greatly shortened, and traffic of the Internet is much reduced because the data communication between the internal nodes of the mobile network does not go through the Internet.

Although an embodiments of the present invention has been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A router supporting network mobility over a nested mobile network environment, comprising:
    a first interface for data communication with an external node;
    a second interface for data communication with an internal node; and
    a controller to control routing through at least one of the first or second interfaces, to obtain an address of an end router that is the nearest to an Internet from a mobile network when a present position is found in a node on a nested mobile network, and to transmit through the first interface a binding update message including the address of the end router for tunneling between the end router and a home agent,
    wherein the controller adds to the binding update message a flag indicating a nested state of the mobile network, and
    wherein the binding update message is not capsulated and not decapsulated in one or more nodes between the end router and the present position on the nested mobile network.

2. The router of claim 1, wherein, when the binding update message is received through the second interface and a higher level mobile network is not present, the controller adds to the binding update message a header indicating the controller's address as a source address, and transmits the binding update message including the header to a home agent of the mobile router that transmitted the binding update message.

3. The router of claim 1, wherein the external node is a mobile router or a mobile or fixed router connected to the Internet.

4. The router of claim 1, wherein the internal node is mobile terminal or a mobile router.

5. The router of claim 1, wherein the address of an end router is obtained by requesting a care of address (CoA) and obtaining, through internal routing, CoA information of the end router, the router recognizing the CoA of each node on the mobile network through internal routing within the mobile network.

6. A method of tunneling of a router over a nested mobile network environment, comprising:
    routing through at least one of a first interface or a second interface, the first and second interfaces being for data communication with an external node and an internal node, respectively, to find a present position on a mobile network;
    obtaining an address of an end router that is the nearest to an Internet from the entire mobile network when a present position on the mobile network is found in a node on the nested mobile network;
    generating a binding update message including the address of the end router when the address of the end router is obtained; and
    transmitting the binding update message through the first interface for tunneling between the end router and a corresponding home agent when the binding update message is generated,
    wherein the binding update message includes a flag indicating a nested state of the mobile network, and
    wherein the binding update message is not capsulated and not decapsulated in one or more nodes between the end router and the present position on the nested mobile network.

7. The method according to claim 6, further comprising:
    adding to the binding update message a header having a present address as a source address when a higher level mobile network is not present and the binding update message is received through the second interface; and
    transmitting the binding update message including the header to a home agent of the mobile router that sent the binding update message through the first interface.

8. A method of quickening data packet transfer in a nested mobile network environment, comprising:
    forming a tunnel between a home agent of a mobile router and an end router closest to an Internet by
        routing through at least one of a first interface or a second interface, the first and second interfaces being for data communication with an external node and an internal node, respectively, to find a present position on a mobile network,
        obtaining an address of the end router from the entire mobile network when a present position on the mobile network is found in a node on the nested mobile network,
        generating a binding update message including the address of the end router when the address of the end router is obtained, and
        transmitting the binding update message through the first interface for tunneling between the end router and a corresponding home agent when the binding update message is generated; and
    transmitting the data packet from the home agent to the end router through the tunnel,
    wherein the binding update message includes a flag indicating a nested state of the mobile network, and
    wherein the binding update message is not capsulated and not decapsulated in one or more nodes between the end router and the present position on the nested mobile network.

9. The method of claim 8, wherein data communication between internal nodes of the mobile network remains inside of the mobile network and is performed according to a routing protocol within the mobile network.

10. The method of claim 8, wherein the mobile routers do not have to capsulate the data packet.

11. A method of reducing Internet traffic during data communication between nodes of a nested mobile network, comprising:

forming a tunnel between a home agent of a mobile router and an end router closest to an Internet by routing through at least one of a first interface or a second interface, the first and second interfaces being for data communication with an external node and an internal node, respectively, to find a present position on a mobile network, obtaining an address of the end router from the entire mobile network when a present position on the mobile network is found in a node on the nested mobile network, generating a binding update message including the address of the end router when the address of the end router is obtained, and transmitting the binding update message through the first interface for tunneling between the end router and a corresponding home agent when the binding update message is generated; and transmitting the data packet from the home agent to the end router through the tunnel, wherein the data communication between the nodes does not go through the Internet, wherein the binding update message includes a flag indicating a nested state of the mobile network, and wherein the binding update message is not capsulated and not decapsulated in one or more nodes between the end router and the present position on the nested mobile network.

* * * * *